US005668525A

United States Patent [19]
Chiu et al.

[11] Patent Number: 5,668,525
[45] Date of Patent: Sep. 16, 1997

[54] COMPARATOR CIRCUIT USING TWO BIT TO FOUR BIT ENCODER

[75] Inventors: Tom Tien-Cheng Chiu; Donald George Mikan, Jr.; John Stephen Muhich, all of Austin, Tex.

[73] Assignee: International Business Machines Corporation, Armonk, N.Y.

[21] Appl. No.: 710,443

[22] Filed: Sep. 17, 1996

[51] Int. Cl.⁶ ........................................ G06F 7/02
[52] U.S. Cl. .......................................... 340/146.2
[58] Field of Search .............................. 340/146.2

[56] References Cited

U.S. PATENT DOCUMENTS

| 5,281,946 | 1/1994 | Van Le | 340/146.2 |
| 5,319,347 | 6/1994 | McClure | 340/146.2 |

OTHER PUBLICATIONS

"Serial Comparison by Symbolic Logic" Robert Brooks Instruments and Control System—vol. 33 pp. 766–767. May 1960.

*Primary Examiner*—Margaret Rose Wambach
*Attorney, Agent, or Firm*—Raymond M. Galasso; Jenkens & Gilchrist; Anthony V. S. England

[57] ABSTRACT

Comparative circuits 10, 100 for comparing a first address comprising at least two bits to a second address comprising an equal number of corresponding bits as the first address to determine if the first address equals or does not equal the second address as disclosed. Comparative circuits 10, 100 include two bit to four bit encoders for encoding each two bits of the first address into a first four bit representation, wherein each bit has an on state and an off state and only one of the four bits is in the on state at one time, each two bits of the second address into a second four bit representation, wherein each bit corresponds to a bit from the first four bit representation. The four bit representations are then inputted into the remainder of the comparator circuits 10, 100.

27 Claims, 6 Drawing Sheets

FIG. 1

| BIT LOCATION | | | | |
|---|---|---|---|---|
| $2^4$ | $2^3$ | $2^2$ | $2^1$ | $2^0$ |
| R4 | R3 | R2 | R1 | R0 |
| W4 | W3 | W2 | W1 | W0 |

READ ADDRESS
WRITE ADDRESS

FIG. 2

| BIT LOCATION | | | | | | | | | | |
|---|---|---|---|---|---|---|---|---|---|---|
| $2^9$ | $2^8$ | $2^7$ | $2^6$ | $2^5$ | $2^4$ | $2^3$ | $2^2$ | $2^1$ | $2^0$ | |
| RA_11 | RA_10 | RA_01 | RA_00 | RB_11 | RB_10 | RB_01 | RB_00 | RC_0 | RC_1 | ENCODED READ ADDRESS |
| WA_11 | WA_10 | WA_01 | WA_00 | WB_11 | WB_10 | WB_01 | WB_00 | WC_0 | WC_1 | ENCODED WRITE ADDRESS |

FIG. 3

2 BIT TO 4 BIT ENCODING

| INPUT BITS | | | OUTPUT BITS | | | |
|---|---|---|---|---|---|---|
| $W_4$ | $W_3$ | | WA_11 | WA_10 | WA_01 | WA_00 |
| $W_2$ | $W_1$ | | WB_11 | WB_10 | WB_01 | WB_00 |
| $R_4$ | $R_3$ | | RA_11 | RA_10 | RA_01 | RA_00 |
| $R_2$ | $R_1$ | | RB_11 | RB_10 | RB_01 | RB_00 |
| 0 | 0 | → | 0 | 0 | 0 | 1 |
| 0 | 1 | → | 0 | 0 | 1 | 0 |
| 1 | 0 | → | 0 | 1 | 0 | 0 |
| 1 | 1 | → | 1 | 0 | 0 | 0 |

FIG. 4

TRUE AND COMPLEMENT BIT GENERATION

| INPUT BITS | | OUTPUT BITS | |
|---|---|---|---|
| $W_0$ | | WC_0 | WC_1 |
| $R_0$ | | RC_0 | RC_1 |
| 0 | → | 1 | 0 |
| 1 | → | 0 | 1 |

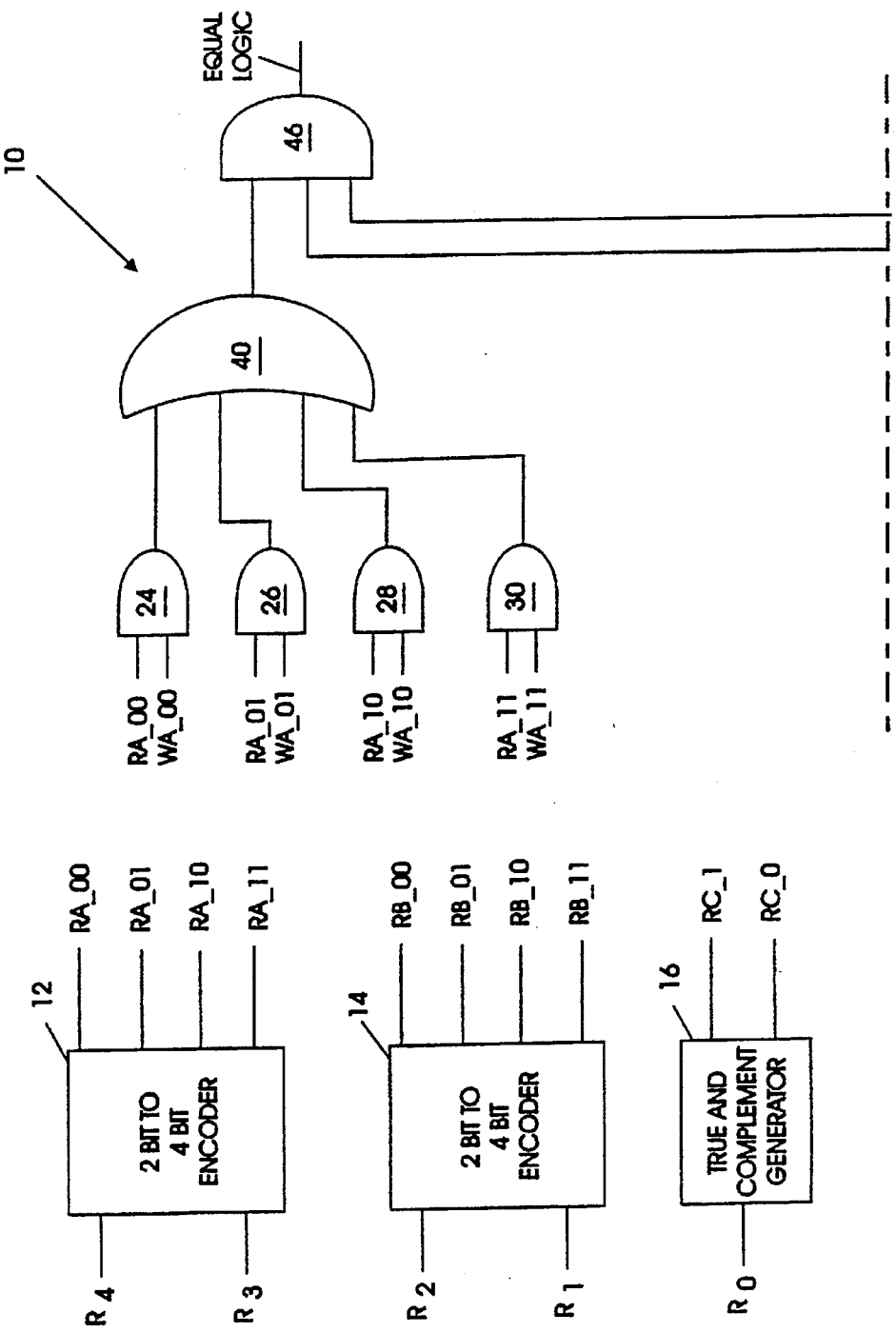

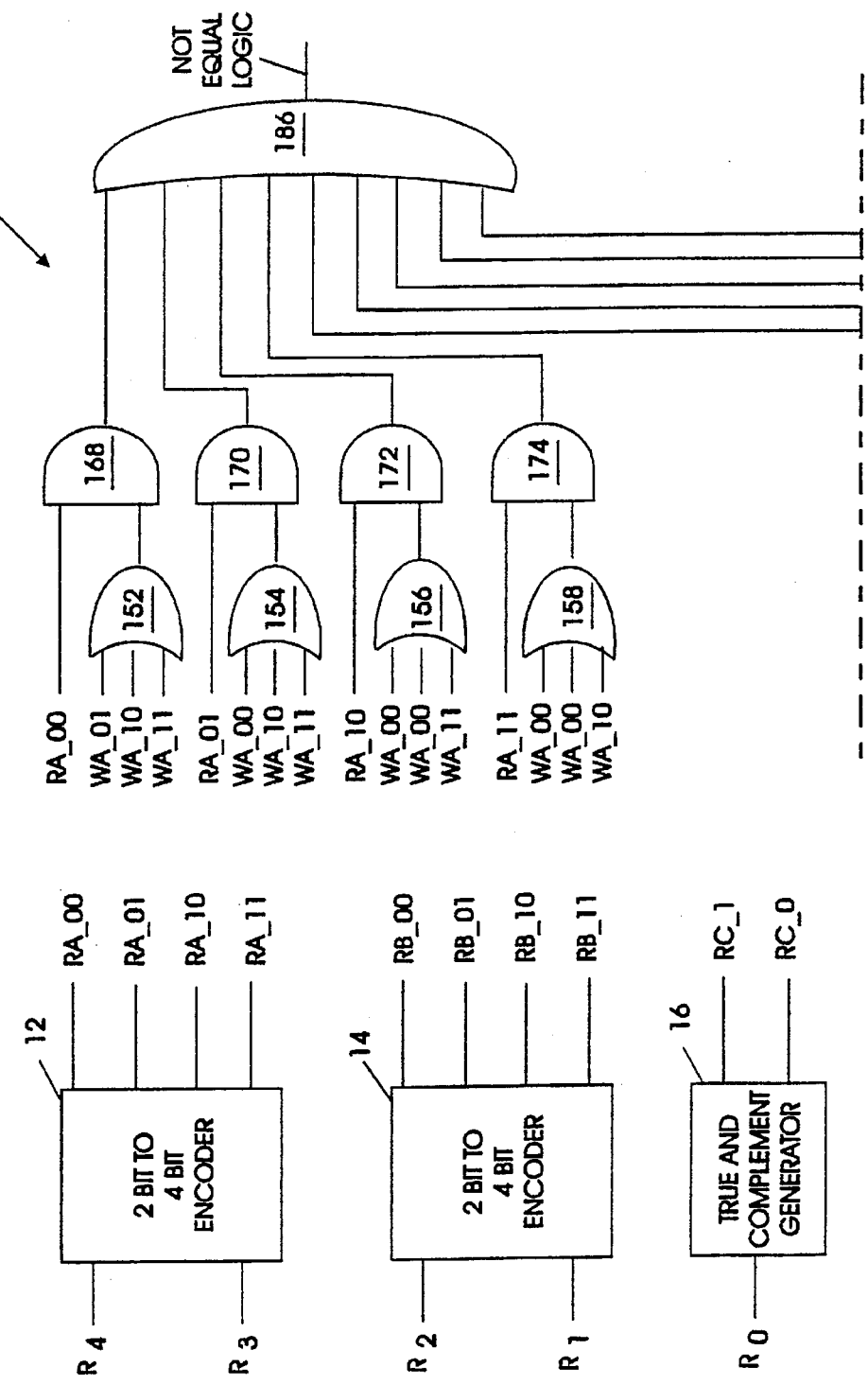

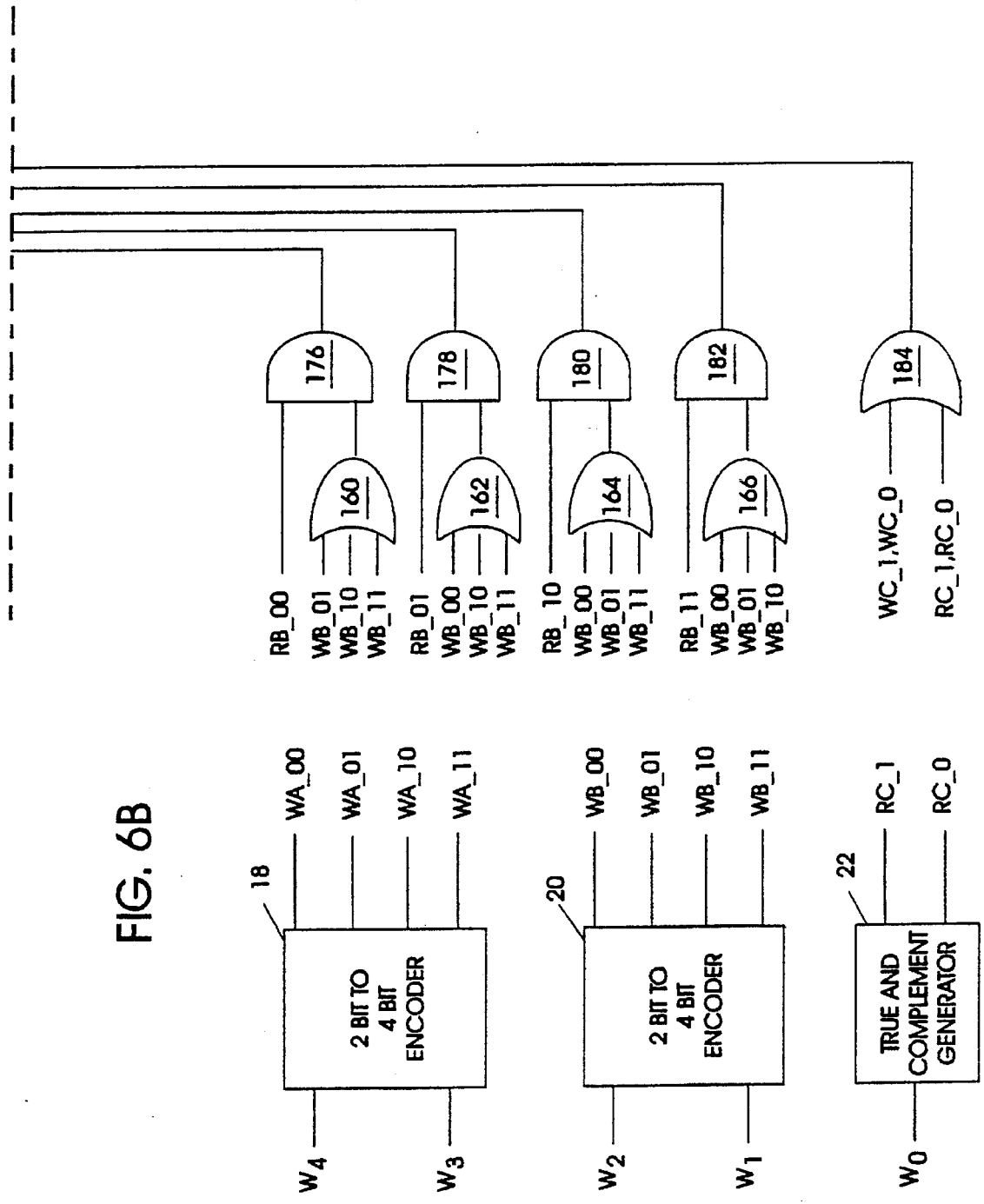

COMPARATOR CIRCUIT USING TWO BIT TO FOUR BIT ENCODER

BACKGROUND OF THE INVENTION

1. Technical Field

The present invention relates to information handling or data processing systems, and in particular to comparator circuits for use therein to determine whether two addresses are equal or not equal.

2. Background Art

The design of a typical computer data processing system or information handling system requires the use of a comparator circuit array for comparing two or more addresses to determine whether the addresses are equal to each other or not equal to each other. For example, read addresses are compared to write addresses for access addressable registers such as a general purpose register ("GPR"). If the read and write addresses are equal, that is the system wishes to read from and write to the same address in the GPR at the same time, a bypass of the read operation may become necessary. Such computer data processing systems or information handling systems using dynamic-based circuitry require a positive logic signal indicating whether two addresses are equal and a positive logic signal indicating whether two addresses are not equal at virtually the same time.

Conventional comparator circuits for determining whether two addresses are equal or not equal require addresses which are encoded into a dual rail format. In other words, these circuits require the true and complement of the bits making up the addresses to be compared. The conventional comparator circuit for determining whether two addresses are equal utilizes an exclusive nor (XNOR) gate that receives as inputs the true and complement of the addresses to be compared. The conventional comparator circuit for determining whether two addresses are not equal utilizes an exclusive or (XOR) gate that receives as inputs the true and complement of the addresses to be compared. These conventional prior art comparator circuits do not work for specially encoded addresses, i.e., addresses not utilizing the dual rail format or true and complement format.

Other encoding schemes for use within computer data processing or information handling system have been developed to decrease overall power consumption and increase noise margin. In particular an encoded scheme for mapping two bits to four bits wherein only one of the four bits is "on" or in a high state (logical "1" as opposed to "0") at any given time has been developed. What is needed is a comparator circuit for comparing two addresses which are represented by such a two bit to four bit encoded scheme to determine whether the two addresses are equal or not equal.

SUMMARY OF THE INVENTION

Accordingly, the present invention is directed to a comparator circuit for comparing a first and second address wherein the addresses are represented by a number of binary logic bits. The comparator circuit includes means for grouping the bits of the first and second addresses into certain corresponding sets, means for encoding a set into a corresponding encoded set wherein only one bit of the encoded set has a predefined logic state, and means for comparing bits of an encoded set of the first address with corresponding bits of the corresponding encoded set of the second address.

The present invention is also directed to a method for comparing a first and second address wherein the address is represented by a number of binary logic bits. The method includes the steps of grouping the bits of the first and second address into certain corresponding sets, encoding a set into a corresponding encoded set, wherein only one bit of the encoded set has a predefined logic state, and comparing bits of an encoded set of the first address with corresponding bits of the corresponding encoded set of the second address.

The present invention is also directed to a comparator circuit for comparing a first address comprising at least two bits to a second address comprising an equal number of corresponding bits as the first address to determine if the first address equals the second address. The comparator circuit includes means for encoding each two bits of the first address into a first four bit representation wherein each bit has an on state and an off state and only one of the four bits is in the on state and the second address into a second four bit representation wherein each bit corresponds to a bit from the first four bit representation and has an on state and an off state and wherein only one of the four bits is in the on state.

The comparator circuit further includes four AND gates, each having a pair of inputs and an output per each of the first and second four bit representations for ANDing each single bit of the first four bit representation with a single bit of the second four bit representation corresponding to the single bit of the first four bit representation and one OR gate per each of the first and second four bit representations for ORing each output of the AND gates.

The present invention is also directed to a comparator circuit for comparing a first address comprising at least two bits to a second address comprising an equal number of corresponding bits as the first address to determine if the first address is not equal to the second address. Comparator circuit comprises means for encoding each two bits of the first address into a first four bit representation wherein each bit has an on state and an off state and only one of the four bits is in the on state and the second address into a second four bit representation wherein each bit corresponds to a bit from the first four bit representation and has an on state and an off state and wherein only one of the four bits is in the on state.

The comparator circuit further includes four OR gates, each having three inputs and an output per each of the first and second four bit representations for ORing three of the four bits of the first four bit representation and one AND gate having a first input, a second input, and an output per each of the OR gates for ANDing the output of each OR gate with a selected bit from the second four bit representation wherein the selected bit corresponds to the bit of the first four bit representation which was not ORed by the OR gate.

The primary advantage of the present invention is the provision of a comparator circuit for comparing two addresses to determine whether the addresses are equal or not equal which works with addresses encoded in a scheme other than true and complement or dual rail format. Another advantage to the present invention is provision of a comparator circuit which is faster than the prior art comparator circuits, consumes less power than prior art comparator circuits, and has greater noise immunity than prior art comparator circuits.

BRIEF DESCRIPTION OF THE DRAWINGS

FIG. 1 illustrates an example of a five bit read and write address prior to encoding according to the present invention;

FIG. 2 illustrates an example of the read and write addresses of FIG. 1 encoded according to the encoding scheme utilized in the present invention;

FIG. 3 illustrates the two bit to four bit encoding scheme utilized in the present invention;

FIG. 4 illustrates the generation of true and complement bits according to the present invention;

FIGS. 5, 5A and 5B are schematic block diagram of a comparator circuit for determining whether two addresses are equal according to the present invention; and FIGS. 6, 6A and 6B are schematic block diagram of a comparator circuit for determining whether two addresses are not equal according to the present invention.

DETAILED DESCRIPTION OF A PREFERRED EXEMPLARY EMBODIMENT OF THE INVENTION

Figure 5B:
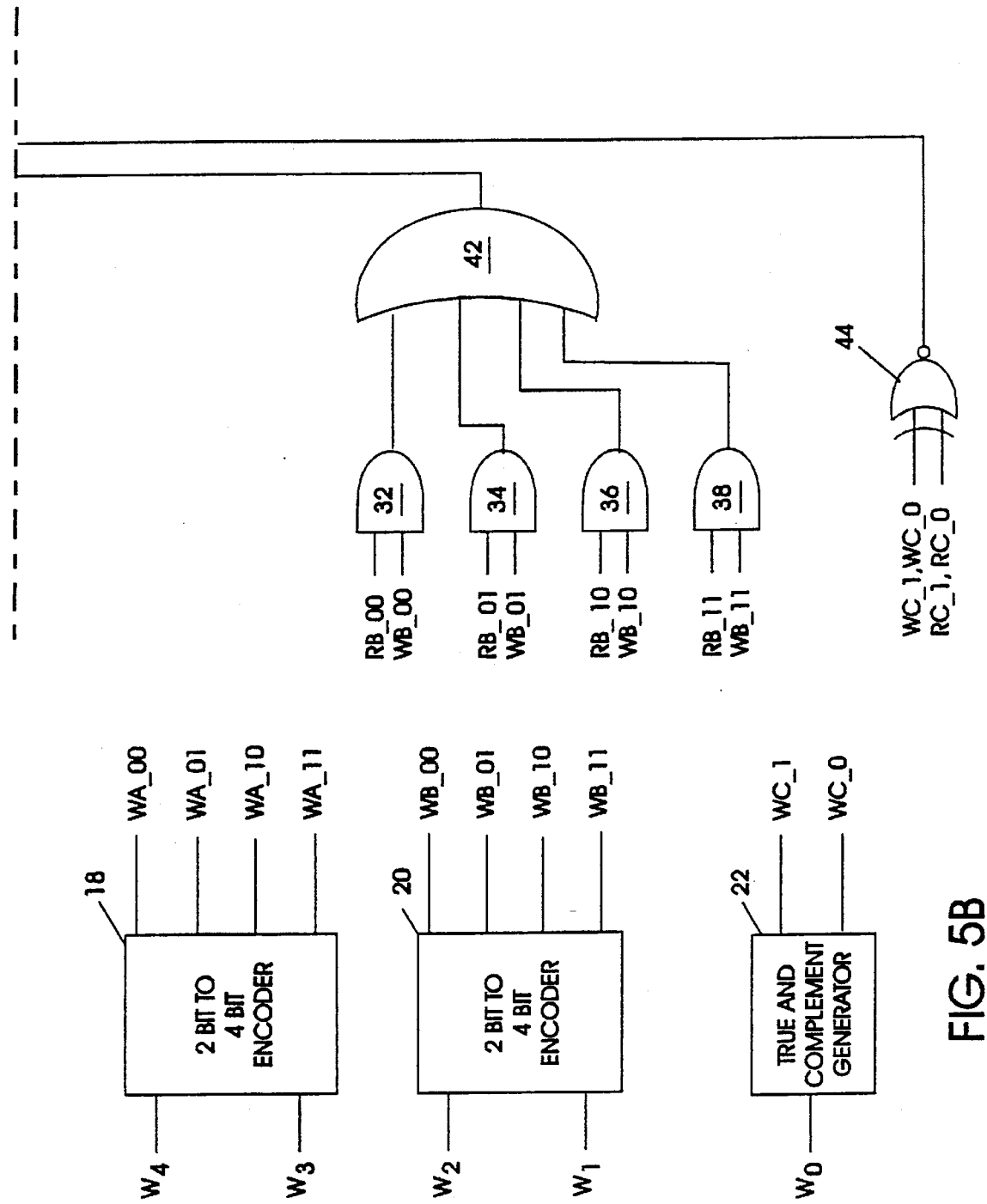

Generally, the present invention provides comparator circuits for determining whether two addresses are either equal or not equal wherein each two bits of the addresses are encoded into a four bit representation. The comparator circuits of the present invention are specifically designed to work only with such a two to four bit encoding scheme and take advantage of the encoding scheme to achieve faster equal and not equal comparisons than the prior art.

Specifically, the comparator circuits of the present invention are designed to work with the encoding scheme illustrated in FIGS. 1–4. Referring to FIG. 1, a read address having five bits is shown, wherein bit R4 is the most significant bit, and bit R0 is the least significant bit. Read address also includes bits R3, R2, and R1. The write address also includes five bits, including the most significant bit W4 and the least significant bit W0. The write address also includes bits W3, W2, and W1. Bits R4 and W4 occupy a bit location corresponding to $2^4$. Bits R3 and W3 occupy a bit location corresponding to $2^3$. Bits R2 and W2 occupy a bit location corresponding to $2^2$. Bits R1 and W1 occupy a bit location corresponding to $2^1$, and bits R0 and W0 occupy a bit location corresponding to $2^0$. Bits R4 and R3 are encoded into a four bit representation comprising most significant bit RA__11, bit RA__10, bit RA__01, and least significant bit RA__00 as illustrated in FIG. 2. Read address bits R2 and R1 are similarly encoded into a four bit representation comprising most significant bit RB__11, bit RB__10, bit RB__01, and least significant bit RB__00. The complement of bit R0 is then generated to provide the true and complement of bit R0, represented by bits RC__0 and RC__1, respectively. In this manner, an encoded read address is formed from the read address and comprises a total of ten bits ranging from most significant bit RA__11 to least significant bit RC__1 as illustrated in FIG. 2. An encoded write address is generated from the write address in a similar manner as the encoded read address as illustrated in FIG. 2.

FIG. 3 illustrates the actual two bit to four bit encoding or mapping utilized in the present invention, and FIG. 4 illustrates the well-known true and complement generation.

FIGS. 1–4 provide only one example to illustrate the present invention. It will be appreciated that the read and write addresses to be compared may have any number of bits equal to or greater than two. The comparator circuits of the present invention produce encoded read and write addresses from the read and write addresses, respectively.

Referring to FIG. 5, a comparator circuit 10 for comparing addresses to determine whether the addresses are equal according to the present invention is shown. It will be appreciated that the addresses can be the read address and the write address illustrated in FIG. 1. It will also be appreciated that comparator circuit 10 can compare any two signals having two bits or more and that the two signal do not necessarily have to be addresses. It will also be appreciated that although, for illustrative purposes, the five bit read and write addresses of FIG. 1 have been used to illustrate comparator circuit 10, any odd or even number of bits over 2 bits may be used. Comparator circuit 10 includes a first two bit to four bit read encoder 12 and a second two bit to four bit read encoder 14. First read encoder 12 has as inputs bits R4 and R3 and as outputs, bits RA__11, RA__10, RA__01, and RA__00. In this manner, first read encoder 12 is a two bit to four bit encoder which maps bits R4, R3 into bits RA__11, RA__10, RA__01, RA__00 according to the encoding scheme set forth in FIG. 3. For example, if bit R4 is 0 and R3 is 0, bits RA__11, RA__10, and RA__01 will be 0, and bit RA__00 will be 1. It is to be noted that only one of the four bits outputted from first read encoder 12 is in the high state or on state (i.e., logical ("1") at any one time. In a similar manner, second read encoder 14 maps bits R2 and R1 into bits RB__11, RB__10, RB__01, and RB__00. Second read encoder 14 maps bits R2, R1 into bits RB__11, RB__10, RB__01, and RB__00 according to the encoding scheme set forth in FIG. 3.

If the read and write addresses comprise an odd number of bits, it becomes necessary to generate the true and complement of one of the bits, in this case, bit R0. Bit R0 is inputted into true and complement generator 16 which produces or passes through the true bit R4 represented by RC__0 and its complement RC__1. In other words, true and complement generator 16 maps bit R0 into bits RC__0 and RC__1 according to the encoding/mapping scheme set forth in FIG. 4. It is to be noted that true and complement generator 16 is only necessary if read and write addresses have an odd number of bits.

Comparator circuit 10 further includes a first write encoder 18 identical to first read encoder 12 except for having bits W4 and W3 as inputs and bits WA__11, WA__10, WA__01, and WA__00 as outputs wherein the two bits W4, W3 are mapped into the four bits WA__11, WA__10, WA__01, and WA__00 according to the scheme set forth in FIG. 3. Comparator circuit 10 further includes a second two bit to four bit write encoder 20, identical to second read encoder 14, except for having inputs W2 and W1 and outputs WB__11, WB__10, WB__01, and WB__00. Second write encoder 20 maps bits W2 and W1 into bits WB__11, WB__10, WB__01, and WB__00 according to the scheme set forth in FIG. 3. A second true and complement generator 22 is provided for generating the true and complement of bit W0 wherein the true bit W4 is represented by the output WC__0 and the complement of bit W4 is represented by the output WC__1. It is again to be noted that second true and complement generator 22 is not necessary if read and write addresses have an even number of bits.

It is also to be noted that any number of two bit to four bit encoders and true and complement generators may be employed to accommodate read and write addresses having any number of bits greater than or equal to two bits. For example, only one two bit to four bit encoder could be used to encode every bit of the read and write addresses. If read and write addresses originally have ten bits, five two bit to four bit encoders may be employed. In this manner, each two bits of read and write addresses are mapped into a first and second four bit representation, respectively, wherein only one of the four bits is in an on state or high state (logical "1") any one time.

The least significant bit of the read address R0 corresponds to least significant bit of write address W0. Bit R1 corresponds to bit W1. Bit R2 corresponds to bit W2. R3 corresponds to bit W3 and the most significant bit of read address R4 corresponds to the most significant bit of write address W4. In like manner, bit RA__00 of encoded read address corresponds to bit WA__00 of encoded write address, bit RA__01 corresponds to bit WA__01, bit RA__10 corresponds to bit WA__10, bit RA__11 corresponds to bit WA__11, bit RB__00 corresponds to bit WB__00, bit RB__01 corresponds to bit WB__01, bit RB__10 corresponds to bit WB__10, bit RB__11 corresponds to bit WB__11.

Bit R0 corresponding to bit W0 means that bit R0 and bit W0 represent identical powers of two as illustrated in FIG. 1. In other words, bit R0 and bit W0 occupy the same bit locations, in this case bit location $2^0$. To determine whether the read address equals the write address each corresponding bit of the encoded read address and encoded write address must be compared.

Comparator circuit 10 further includes a plurality of AND gates 24, 26, 28, 30, 32, 34, 36, and 38. AND gate 24 ANDS bits RA__00 and WA__00, AND gate 26 ANDS bits RA__01 and WA__01, AND gate 28 ANDS bits RA__10 and WA__10, AND gate 30 ANDS bits RA__11 and WA__11, AND gate 32 ANDS bits RB__00 and WB__00, AND gate 34 ANDS bits RB__01 and WB__01, AND gate 36 ANDS bits RB__10 and WB__10, and AND gate 38 ANDS bits RB__11 and bit WB__11. In other words, each corresponding bit from the encoded read address and the encoded write address are ANDed for each two bits of the read address and the write address and four AND gates, each having a pair of inputs, become necessary. The outputs of AND gates 24, 26, 28, and 30 are coupled to the inputs of OR gate 40 for ORing the outputs of AND gates 24, 26, 28, and 30. The outputs of AND gates 32, 34, 36, and 38 are coupled to the inputs of OR gate 42 for ORing the outputs of AND gates 32, 34, 36, and 38. Bits RC__1, WC__1, RC__0 and WC__0 are inputted into an exclusive nor (XNOR) gate 44. The outputs of OR gate 40, OR gate 42, and XNOR gate 44 are inputted into an AND gate 46. Logic 1 at the output of AND gate 46 indicates that the read address equals the write address.

Referring now to FIG. 6, a comparator circuit 100 for comparing a first address to a second address to determine whether the first address does not equal the second address, according to the invention is shown. Reference numerals and alphanumeric bit identifiers used in FIG. 6 which are identical to the reference numerals and/or alphanumeric bit identifiers of FIG. 5 indicate identical parts and/or bits.

Comparator circuit 100 further includes one OR gate 152, 154, 156, 158, 160, 162, 164, and 166 for each bit and corresponding bit of the encoded read and write addresses. Said another way, comparator circuit 100 includes four OR gates per each two bits of the read or write addresses. Write address encoder 18 is coupled to OR gates 152, 154, 156, 158 such that bits WA__01, WA__10, and WA__11 are inputted into OR gate 152, bits WA__00, WA__10, and WA__11 are inputted into OR gate 154, bits WA__00, WA__01, and WA__11 are inputted into OR gate 156, and bits WA__00, WA__01, and WA__10 are inputted into OR gate 158. In a like manner, second write address encoder 20 is coupled to OR gates 160, 162, 164 and 166 such that bits WB__01, WB__10, and WB__11 are inputted into OR gate 160, bits WB__00, WB__10, and WB__11 are inputted into OR gate 162, bits WB__00, WB__01, and WB__11 are inputted into OR gate 164, and bits WB__00, WB__01, and WB__10 are inputted into OR gate 166.

Comparator circuit 100 further includes one AND gate 168, 170, 172, 174, 176, 178, 180, 182 per each OR gate 152, 154, 156, 158, 160, 162, 164, and 166. The output of OR gate 152 is coupled to the input of AND gate 168, the output of OR gate 154 is coupled to the input of AND gate 170, the output of OR gate 156 is coupled to the input of AND gate 172, the output of OR gate 158 is coupled to the input of AND gate 174, the output of OR gate 160 is coupled to the input of AND gate 176, the output of OR gate 162 is coupled to the input of AND gate 178, the output of OR gate 164 is coupled to the input of AND gate 180, and the output of OR gate 166 is coupled to the input of AND gate 182.

Bit RA__00, corresponding to the write address bit not inputted into OR gate 152 is inputted into AND gate 168. Likewise, bit RA__01 is inputted into AND gate 170, bit RA__10 is inputted into AND gate 172, bit RA__11 is inputted into AND gate 174, bit RB__00 is inputted into AND gate 176, bit RB__01 is inputted into AND gate 178, bit RB__10 is inputted into AND gate 180, and bit RB__11 is inputted into AND gate 182.

It is to be noted that bits RA__00, RA__01, RA__10, RA__11, RB__00, RB__01, RB__10, and RB__11 correspond to the respective write address bit not inputted into OR gates 152-166. Additionally, bit WC__1, WC__0, RC__1, and RC__0 are inputted into exclusive or (XOR) gate 184. The output of each AND gate 168-182 and XOR gate 184 is coupled to the input of an OR gate 186. The output of OR gate 186 is used to indicate whether the read address does not equal the write address, and this is indicated by a logic 1.

Although the present invention and its advantages have been described in detail, it should be understood that various changes, substitutions and alterations can be made herein without departing from the spirit or scope of the invention as defined in the appended claims.

What is claimed is:

1. A comparator circuit for comparing a first and second address wherein said addresses are represented by a number of binary logic bits, said circuit comprising:

means for grouping said bits of the first and second addresses into certain corresponding sets;

means for encoding a set into a corresponding encoded set wherein only one bit of said encoded set has a predefined logic state; and means for comparing bits of an encoded set of the first address with corresponding bits of the corresponding encoded set of the second address.

2. The comparator circuit, as recited in claim 1, wherein said means for grouping includes means for grouping said bits of the first and second addresses into corresponding sets of two logic bits.

3. The comparator circuit, as recited in claim 2, wherein said means for encoding includes means for encoding said corresponding sets of two logic bits into corresponding encoded sets of four logic bits wherein only one of the four logic bits is in an on state.

4. The comparator circuit, as recited in claim 3, wherein said means for comparing comprises:

AND gates for ANDing said corresponding encoded sets; and

OR gates for ORing the outputs of said AND gates.

5. The comparator circuit, as recited in claim 4, wherein said AND gates and said OR gates include four AND gates and one OR gate for every encoded set of four logic bits.

6. The comparator circuit, as recited in claim 5, further comprising an XNOR gate for XNORing a single bit from the first address with a single bit from the second address if the first and second addresses comprise an odd number of bits.

7. The comparator circuit, as recited in claim 6, further comprising means for providing the true and complement of each bit from the first and second addresses to the inputs of said XNOR gate.

8. The comparator circuit, as recited in claim 6, further comprising a second AND gate for ANDing the output of said XNOR gate and the output of said OR gates wherein the output of said second AND gate indicates whether the first address does not equal the second address.

9. The comparator circuit, as recited in claim 3, wherein said means for comparing comprises:

OR gates for ORing three of the four bits of said encoded set of the first address; and AND gates for ANDing the outputs of said OR gates with a bit from said encoded set of the second address wherein said bit corresponds to the bit of said encoded set of the first address which was not ORed by said OR gates.

10. The comparator circuit, as recited in claim 9, wherein said OR gates and said AND gates include four OR gates and one AND gate for every encoded set of four logic bits.

11. The comparator circuit, as recited in claim 10, further comprising an XOR gate having inputs and an output for XORing a single bit from the first address with a single bit from the second address if the first and second addresses comprise an odd number of bits.

12. The comparator circuit, as recited in claim 11, further comprising means for providing the true and complement of each bit from the first and second addresses to said inputs of said XOR gate.

13. The comparator circuit, as recited in claim 6, further comprising a second OR gate having inputs and an output for ORing said output of said XOR gates and said output of each of said AND gates wherein said output of said second OR gate indicates whether the first address does not equal the second address.

14. A comparator circuit for comparing a first address comprising at least two bits to a second address comprising an equal number of corresponding bits as said first address to determine if said first address equals said second address, said comparator circuit comprising:

means for encoding each two bits of said first address into a first four bit representation wherein each bit has an on state and an off state and only one of the four bits is in said on state and said second address into a second four bit representation wherein each bit corresponds to a bit from said first four bit representation and has an on state and an off state and wherein only one of the four bits is in said on state;

four AND gates, each having a pair of inputs and an output per each of said first and second four bit representations for ANDing each single bit of said first four bit representation with a bit of said second four bit representation corresponding to said single bit of said first four bit representation; and one OR gate per each of said first and second four bit representations for ORing each said output of said AND gates.

15. A comparator circuit for comparing a first address comprising at least two bits to a second address comprising an equal number of corresponding bits as said first address to determine if said first address is not equal to said second address, said comparator circuit comprising:

means for encoding each two bits of said first address into a first four bit representation wherein each bit has an on state and an off state and only one of the four bits is in said on state and said second address into a second four bit representation wherein each bit corresponds to a bit from said first four bit representation and has an on state and an off state and wherein only one of the four bits is in said on state;

four OR gates, each having three inputs and an output per each of said OR gates for ORing three of the four bits of said first four bit representation; and one AND gate having a first input, a second input and an output per each of said OR gates for ANDing said output of each said OR gate with a selected bit from said second four bit representation wherein said selected bit corresponds to the bit of said first four bit representation which was not ORed by said OR gate.

16. A method for comparing a first and second address, an address being represented by a number of binary logic bits, the method comprising:

grouping the bits of the first and second address into certain corresponding sets;

encoding a set into a corresponding encoded set, wherein only one bit of the encoded set has a predefined logic state; and comparing bits of an encoded set of the first address with corresponding bits of the corresponding encoded set of the second address.

17. The method, as recited in claim 16, wherein said step of grouping further includes the step of grouping the bits of the first and second addresses into corresponding sets of two logic bits.

18. The method, as recited in claim 17, wherein said step of comparing includes the steps of providing AND gates for ANDing the corresponding encoded sets and ORing the outputs of the AND gates.

19. The method, as recited in claim 18, further including the step of providing four AND gates and one OR gate for every encoded set of four logic bits.

20. The method, as recited in claim 19, further including the step of providing a XNOR gate for XNORing a single bit from the first address with a single bit from the second address corresponding to the single bit from the first address if the first and second addresses comprise an odd number of bits.

21. The method, as recited in claim 20, further including the step of providing the true and complement of the bits from the first and second addresses to the inputs of the XNOR gate.

22. The method, as recited in claim 20, further including the step of providing a second AND gate for ANDing the output of XNOR gate and the output of the OR gates wherein the output of the second AND gate indicates whether the first address equals the second address.

23. The method, as recited in claim 17, wherein said step of comparing includes the steps of providing OR gates for ORing three of the four bits of the encoded set of the first address and ANDing the outputs of the OR gates with a bit from the encoded set of the second address wherein the bit corresponds to the bit of the encoded set of the first address which was not ORed by the OR gates.

24. The method, as recited in claim 23, further including the step of providing four OR gates and one AND gate for every encoded set of four logic bits.

25. The method, as recited in claim 24, further including the step of providing an XOR gate for XORing a single bit from the first address with a single bit from the second address if the first and second addresses comprise an odd number of bits.

26. The method, as recited in claim 25, further including the step of providing the true and complement of each bit from the first and second addresses to the inputs of the XOR gate.

27. The method, as recited in claim 25, further including the step of providing a second OR gate for ORing the output of the XOR gates and the output of the AND gates wherein the output of the second OR gate indicates whether the first address does not equal the second address.

* * * * *